(12) United States Patent
Gerrits et al.

(10) Patent No.: US 9,506,023 B2
(45) Date of Patent: Nov. 29, 2016

(54) STABILISED PARTICLES IN AN ALCOHOLIC BEVERAGE

(75) Inventors: Antonius Johannes Maria Gerrits, Elsendorp (NL); Rianne Maria Allegonda Hendrik Van Schaijk, Oss (NL)

(73) Assignee: FrieslandCampina Nederland Holding B.V., Amersfoort (NL)

( * ) Notice: Subject to any disclaimer, the term of this patent is extended or adjusted under 35 U.S.C. 154(b) by 323 days.

(21) Appl. No.: 13/058,832

(22) PCT Filed: Aug. 12, 2009

(86) PCT No.: PCT/NL2009/050489
§ 371 (c)(1),
(2), (4) Date: Feb. 11, 2011

(87) PCT Pub. No.: WO2010/019036
PCT Pub. Date: Feb. 18, 2010

(65) Prior Publication Data
US 2011/0143010 A1      Jun. 16, 2011

(30) Foreign Application Priority Data
Aug. 13, 2008   (NL) .................................... 2001885

(51) Int. Cl.
*C12G 3/00* (2006.01)
*C12G 3/06* (2006.01)

(52) U.S. Cl.
CPC ....................... *C12G 3/06* (2013.01)

(58) Field of Classification Search
CPC ...................................... C12G 3/06
USPC ....................................... 426/592
See application file for complete search history.

(56) References Cited

U.S. PATENT DOCUMENTS

| 4,427,681 | A | * | 1/1984 | Munshi ..................... 514/289 |
| 4,639,374 | A | | 1/1987 | Matsunobu et al. |
| 4,876,106 | A | * | 10/1989 | Sabatura .................... 426/583 |
| 4,980,193 | A | | 12/1990 | Tuason et al. |
| 5,079,027 | A | | 1/1992 | Wong et al. |
| 5,478,591 | A | * | 12/1995 | Bevers et al. ............... 426/592 |

FOREIGN PATENT DOCUMENTS

| AT | 9400420 A | * | 11/1994 |
| AT | 399 719 B | | 7/1995 |
| CN | 101406302 A | * | 4/2009 |
| DE | 10 2004 043 972 A1 | | 3/2006 |
| EP | 0 381 259 A2 | | 8/1990 |
| EP | 0 581 374 A1 | | 2/1994 |
| ES | 2 072 803 A1 | | 7/1995 |
| FR | 2 269 577 A1 | | 11/1975 |
| FR | 2 701 484 A1 | | 8/1994 |
| WO | WO-2006/079664 A2 | | 8/2006 |
| WO | WO-2007/041395 A2 | | 4/2007 |

OTHER PUBLICATIONS

"Nut Liqueurs," The Cook's Thesaurus, [Online] Jan. 17, 2008, XP002517517, Retrieved from the Internet: URL:http://web.archive.org/web/20080117050537/http://www.foodsubs.com/LiqueurNut.html , retrieved on Mar. 3, 2009.
Search Report mailed Jun. 7, 2010 in International application No. PCT/NL2009/050489.

* cited by examiner

*Primary Examiner* — Vera Stulii
(74) *Attorney, Agent, or Firm* — Foley & Lardner LLP; Sunit Talapatra

(57) ABSTRACT

The invention relates to an alcoholic beverage containing between 15 and 150 g/l of a particulate nut material, wherein the nut material has a particle size, preferably bimodal, between 0.05 and 200 ?m and the beverage contains between 0.2 and 1.0 wt. % of a stabiliser comprising microcrystalline cellulose and optionally a soluble and/or anionic polysaccharide such as CMC.

14 Claims, No Drawings

STABILISED PARTICLES IN AN ALCOHOLIC BEVERAGE

The present invention pertains to a creamy nut liqueur and to a process of producing it.

BACKGROUND

Nut liqueurs are well-known in the art. The most common type of nut liqueurs are of the clear type, and are essentially spirits containing nut extracts or nut flavourings. Examples include Amaretto (almond and apricot pits), Frangelico and Noisette (hazelnut), and Nocello and Nocciole (walnut). Creamy variants thereof include crème d'amande and crème de noyaux (almond), and crème de noix (walnut), and also contain nut extracts or flavourings only. DE 102004043972 describes a process for producing a hazelnut spirit by soaking roasted hazelnuts in alcohol for several weeks and then distilling.

There is a consumer's need to provide a nut liqueur, which does not just have the taste of nuts, but also has a nutty mouthfeel connecting the nut flavour to a solid nutty component. This need is not met by existing liqueur products.

SUMMARY OF THE INVENTION

It was found that an excellent, stable nut liqueur can be produced on the basis of a nut paste by producing and homogenising a particulate composition having particle sizes in the range of 0.02-200 µm and using a stabiliser system based on micro-crystalline cellulose or equivalents thereof.

DETAILED DESCRIPTION

Thus, the invention pertains to a alcoholic beverage containing between 15 and 150 g/l of a particulate nut material, wherein the nut material has a particle size between 0.05 and 200 µm and the beverage contains between 0.2 and 1.0 wt. % of a stabiliser comprising microcrystalline cellulose.

The nut material is understood to mean edible material derived from nuts as such. So, the husk, skin or hide and other parts that are not normally eaten, are removed and not counted within nut material as herein defined. Any additives, solvents and the like are not counted with the nut material. For coconut, the nut material is the material obtained by drying the combined coconut milk and meat. For cocoa, the nut material is the dry cocoa mass having a fat content of about 45-55 wt. %.

Preferably, the alcoholic beverage contains between 25 and 125 g/l, most preferably between 35 and 100 g of the particulate nut material. The nut material can be derived from any edible nuts, or nut-like fruits, such as peanut, walnut, hazelnut, almond, cashew, pecan, pine nut, pistachio, Brazil nut, macadamia nut, coconut and cocoa, or mixtures of two or more nut types. In a preferred embodiment, the nut material is a mixture comprising almond, hazel and pistachio. The preferred amount of nut material depends on the particular nut type. For example, walnut can be used at a level of 25-60 g/l, other nuts like almonds can be used at a level of 40-100 g/l and nuts like hazelnut can be used at levels of 75-150 g/l. For combinations, for example of almond, hazelnut and pistachio, the total level can be e.g. 35-100 g/l.

An important constituent of the alcoholic beverage of the invention is the stabiliser system for stabilising the nut material in the final product. It was found that a suitable stabiliser comprises microcrystalline cellulose (MCC). Preferably, the alcoholic beverage contains between 0.2 and 1.0 wt. % of such a stabiliser comprising microcrystalline cellulose The level of MCC in the final product is preferably between 0.15 and 0.90 g/l. For optimum effectiveness of the stabiliser, the presence of a co-stabiliser is desirable. In particular, the stabiliser comprises, on a weight basis, 2-40%, preferably 5-30%, most preferably 8-24% of a polysaccharide.

The polysaccharide co-stabiliser is preferably water-soluble and is preferably non-gelling. It can be e.g. a cellulose derivative such as hydroxyalkyl or carboxyalkyl cellulose derivatives, for example hydroxypropyl methyl cellulose, hydroxyethyl methyl cellulose, hydroxyethyl cellulose, carboxymethyl cellulose, etc. In particular, the co-stabiliser is an anionic polysaccharide, such as one or more of carboxymethyl cellulose, other carboxymethyl (CM) polysaccharides, such as CM starch, CM β-(1,3)-glucan, CM inulin, CM galactomannans, CM glucomannans, glycuronans (glucuro-nans, galacturonans, mannuronans etc.) such as 6-oxidised glucans (including starch, cellulose and β-glucans), gum arabic, gum tragacanth, carragheenan, gum ghatti, welan gum, rhamsan, alginate, gellan gum, xanthan gum, karaya gum, high-methyl pectin and low-methyl pectin and starch phosphates. Where the gelling properties of the polysaccharides are still too high, these can be lowered by mild hydrolysis so as to arrive at a molecular weight below about 1 MDa. Preferred co-stabilisers include the hydroxyl-alkyl and carboxyalkyl celluloses, CM polysaccharides, gum Arabic, (λ-) carragheenan and xanthan. Most preferred is carboxymethyl cellulose (CMC).

Suitable stabilisers are also described in WO 2007/041395, WO 2006/079664 and EP 0581374. Examples of suitable commercially available stabiliser systems are Avicel RC 591®, Avicel plus CF 2410® or Avicel CL 611® (FMC BioPolymer, Philadelphia, USA), which contain varying ratios of MCC and CMC (sodium salt).

The diminution and dispersion of the nut material into the beverage of the invention results in a bimodal particle size distribution. One (volume) fraction, largely consisting of fat particles, has particle sizes below 3 µm or even below 2 µm down to e.g. 0.25 or even 0.05 µm, the volume fraction being present between 0.05 and 0.75 µtm and especially between 0.1 and 0.6 µm. A second (volume) fraction, comprising cellular residues, has particles sizes above 10 µm, or even above 15 µm, up to e.g. 250 µm, the volume fraction being present between 20 and 200 µm, and especially between 25 and 150 µm. The particle size distribution, including the volume fraction of the beverage, can be measured and calculated using a Laser Particle Size Analyzer, e.g. a Coulter LS230.

The particle size distribution can be achieved by grinding or milling the nut material prior to mixing it with the beverage base, and by homogenising after admixture. In general, a hammer mill, ball mill, roll mill, drum mill, colloid mill or disk or stone mill is used for reducing the particle size of the nut material. Also extrusion processing may be used. Preferably, a stone mill (comprising rotating stone discs) is used. The specific configuration and operation mode of the mill depend on the type of nut material and the desired final particle size. These are adjusted so as to achieve sufficient reduction in particle size, without changing the flavour of the specific nut material. During the milling process, milling energy is transformed into heat and this heat is absorbed by the nut material. The maximum heat load that can be absorbed before damaging of nut material occurs, needs to be incorporated in the milling process. Preferably, the temperature during the grinding or milling does not exceed 60° C., most preferably does not exceed 50° C. to avoid possible off-taste formation and to retain the delicate flavour of the nut material.

A suitable almond nut material for use in the present invention is described in U.S. Pat. Nos. 4,639,374. 5,079, 027 (EP 381259) describes a process for producing peanut particles, which can be used for preparing the nut material according to the present invention.

The fat content of the alcoholic beverage of the invention is largely determined by the fat content of the nut material. As shown in table 1, most nut materials have fat contents between 45 and 80 wt. % (dry matter basis). The fat content of the beverage is preferably between 10 and 90 g/l, more preferably between 20 and 60 g/l, most preferably between 25 and 40 g/l. If desired, fats from other sources than nuts can be added, e.g. milk fat, coconut oil, soy fat, and may be present in amounts of 1-4% wt. based on the beverage (or 10-40 g/l). Lecithins can be included, but are not necessary.

The protein content of the alcoholic beverage of the invention is primarily determined by the protein content of the nut material. As shown in table 1, most nut materials have protein contents between 10 and 30 wt. % (dry matter basis). The protein content of the beverage is preferably between 3 and 60 g/l, more preferably between 5 and 40 g/l, most preferably between 8 and 24 g/l. If desired, proteins from other sources than nuts can be added, e.g. milk proteins (whey, casein and/or caseinates), other vegetable proteins such as soy, pea, etc. Preferably, the amount of proteins from other sources than nuts is 4-40 g/l, more preferably 6-30 g/l, and most preferred 8-20 g/l. In a particular embodiment, the beverage contains 8-20 g casein per 1.

The digestible carbohydrate content of the alcoholic beverage of the invention is determined to some extent by the carbohydrate content of the nut material. As shown in table 1, most nut materials have carbohydrate contents between 7 and 20 wt. % (dry matter basis). If desired, other sugars can be added, e.g. glucose, glucose syrup, fructose, sucrose, if sweetness is desired, lactose, maltodextrins etc. Maltodextrins can have the additional function of adjusting the viscosity of the beverage, for instance if the protein content of the beverage is low due to a low protein content of the nut material. Hence an embodiment of the invention comprises the presence of 10-100 g/l of maltodextrins, in particular of DE (dextrose equivalent) values between 5 and 25 (average DP (degree of polymerisation) about 4-12). Instead of or in addition to the sugars, artificial sweeteners may be used. The total (digestible) carbohydrate content of the beverage is preferably between 10 and 300 g/l, more preferably between 20 and 240 g/l, most preferably between 40 and 180 g/l.

The alcoholic beverage can further contain non-digestible carbohydrates, including any fibres present in the nut material. Such fibres may be soluble or non-soluble, and can include cellulose, hemicellulose, resistant starch, β-glucans, inulin, plant or bacterial gums, etc. Such fibres may also function as a thickener when desire The alcohol source can be either pure alcohol distilled from for example molasses, grain, potato mass or wine, or from distilled products like there are whisky, rum, calvados, brandy, gin, vodka etc. The alcoholic beverage preferably has an about neutral pH, i.e. especially a pH between 6.5 and 7.5. The alcohol content of the beverage of the invention can have any value as appropriate for the type of beverage. The alcohol content is typically between 75 and 250 g/l, preferably between 110 and 170 g/l, most preferably between 125 and 150 g/l.

Optionally, flavours may be included in the alcoholic beverage to support the basic flavour of the nuts. Preferred flavours are vanilla, chocolate, coffee, caramel, fruit and nut flavours/extracts, including combinations of any of these flavours.

The invention also pertains to a process for producing a alcoholic nut beverage, comprising the steps of:
  dispersing a stabiliser comprising microcrystalline cellulose into an aqueous beverage base;
  mixing into the dispersion, in any order:
    a nut paste;
    any further ingredients;
  wherein at least one of the aqueous beverage base and the further ingredients comprises alcohol.

Preferably, the nut paste contains between 7.5 and 75 wt. %, preferably between 15 and 60 wt. %, most preferably between 20 and 50 wt. % of finely divided nut material, and 0-60 wt. %, preferably 5-40 wt. % of carbohydrates (added, i.e. other than the carbohydrates of the nut material). It may further contain between 0 and 80 wt. %, preferably between 10 and 75, most preferably between 20 and 70 wt. % of water and/or between 0 and 50% of alcohol, or between 20 and 80 wt. % of water and alcohol taken together.

In the process of the invention, the stabiliser is preferably mixed in hot water under vigorous agitation, to give full hydration and dispersion of the dry material. This can be done by high speed blenders, liquefiers, Venturi mixers or homogenisers. The hydrated stabiliser can be added to a protein solution, with or without previous addition of stabilising salts like citrates of phosphates or vice versa. The nut paste can be prepared separately by milling the nut material in the presence of water or sugar (which can act as a grinding aid). After milling to the necessary particle size distribution, alcohol may be added to increase the microbiological shelf life of the nut paste. The nut paste is then blended with the stabiliser-protein solution and carbohydrates and the alcohol source. High speed blenders, liquefiers, Venturi mixers or homogenisers may be used to make a homogeneous blend.

The mixed ingredients blend may be heat-treated to destroy pathogenic micro-organisms. Heat treatment comprises pasteurisation or UHT. A suitable pasteurisation comprises a heat treatment for at least 15 seconds at 72° C. or higher, prior to the homogenisation process. The homogenisation process is preferably done with a high pressure homogeniser at a pressure of at least 100 kg/cm$^2$, preferably at least 200 kg/cm$^2$ up to 300 kg/cm$^2$, followed by cooling to ambient temperature, i.e. around 20° C. The oil droplets present in the nuts will be well reduced in size. Further reduction of the oil droplet size can also be achieved by a second homogenisation process under the same conditions as the first homogenisation step. Preferably the high pressure homogenisation is done at a blend temperature of between 65° C. and 75° C. with a homogenisation pressure of 200-300 bar, followed by cooling to below 30° C., e.g. approximately 20° C. After this step, the particle size distribution is measured e.g. with a Coulter LS 230 and the smallest (oil) particle fraction should be below 0.85 μm. If not, a second homogenisation process needs to be performed. This will reduce the oil droplet size to less than 3 μm, preferably less than 1 μm and this prevents the formation of a fat layer on top of the product after one year storage at ambient temperature.

The product and the process of the invention result in excellent, stable liqueurs with characteristics of superior nutty taste and mouthfeel connecting the original nut into liqueurs.

TABLE 1

Composition of some nut materials (w/w %)

| | protein | carbohydrate | fat | fibre |
|---|---|---|---|---|
| Peanut | 27 | 12 | 52 | 7 |
| Pistache | 20 | 18 | 52 | 9 |
| Walnut | 14 | 12 | 63 | 8 |
| Almond | 19 | 6 | 52 | 11 |
| Hazelnut | 14 | 11 | 62 | 11 |
| Macadamia | 9 | 7 | 76 | 7 |
| Coconut meat | 7 | 18 | 69 | 8 |
| Cocoa mass | 16 | 9 | 57 | 17 |
| Cocoa powder | 19 | 11 | 22 | 30 |

Throughout the experiments, the sodium caseinate used was from DMV International, the Netherlands.

EXAMPLE 1

Almond Liqueur

Stabiliser MCC/CMC (6 g, Avicel RC 591®, FMC Biopolymer, Philadelphia, USA) and 210 g of water were agitated until full hydration. 18 gram protein (sodium caseinate) and 78 g of water were agitated separately until full hydration. Almonds (50 g) and water (75 g) were milled with a stone mill till a particle size smaller than 120 μm.

The stabiliser and protein solution were then blended with the milled almonds. To the resulting liquid alcohol (128 g, 96%), sugar (140 g) and water up to total volume amount of 1000 ml were added. The blend was pasteurised by heating the total blend to 72° C. and then homogenised. The blend was then cooled to ambient temperature and filled in bottles.

EXAMPLE 2

Almond Liqueur with Maltodextrin

Stabiliser MCC/CMC (6 g, Avicel RC 591®, FMC BioPolymer) and 210 g of water were agitated until full hydration. Protein (sodium caseinate, 18 g) and 78 g of water were agitated separately until full hydration. Almonds (50 g) and water (75 g) were milled with a stone mill till a particle size smaller than 120 μm.

The stabiliser and protein solution were then blended with the milled almonds. To the resulting liquid alcohol (128 g, 96%), sugar (140 g) and water up to total volume amount of 800 ml were added. The blend was pasteurised by heating the total blend to 72° C. and then homogenised. The blend was then cooled to ambient temperature and a mixture of 80 g maltodextrin (Maldex 150, supplier Syral Belgium, DE value 13-17), almond flavour (1 g) and water up to a volume of 200 ml, was mixed with a low speed agitator and the total mixture was filled in bottles.

EXAMPLE 3

Almond Liqueur with Maltodextrin and Rum

Stabiliser MCC/CMC (6 g, Avicel RC 591®, FMC BioPolymer) and 210 g of water were agitated until full hydration. Protein (sodium caseinate, 18 g) and 78 g of water were agitated separately until full hydration. Almonds (50 g) and water (75 g) were milled with a stone mill till a particle size smaller than 120 μm.

The stabiliser and protein solution were then blended with the milled almonds. To the resulting liquid alcohol (98 g, 96%), sugar (140 g) and water up to total volume amount of 750 ml were added. The blend was pasteurised by heating the total blend to 72° C. and then homogenised. The blend was then cooled to ambient temperature and a mixture of 80 g maltodextrin (Maldex 150, supplier Syral Belgium, DE value 13-17), almond flavour (1 g), rum distillate (40 g, 75% alcohol) and water up to a volume of 250 ml, was mixed using a low speed agitator and the total mixture was filled in bottles.

EXAMPLE 4

Hazelnut Liqueur

Stabiliser MCC/CMC (6 g, Avicel RC 591®, FMC BioPolymer) and 210 g of water were agitated until full hydration. Protein (sodium caseinate, 18 g) and 78 g of water were agitated separately until full hydration. Hazelnut paste (Barry Callebaut, Belgium) (115 g) and water of 50° C. (150 g) were slowly agitated till a smooth mixture was formed.

The stabiliser and protein solution were then blended with the hydrated hazelnut paste. To the resulting liquid alcohol (128 g, 96%), sugar (200 g) and water up to total volume amount of 1000 ml were added. The blend was pasteurised by heating the total blend to 72° C. and then homogenised. The blend was then cooled to ambient temperature and filled in bottles.

EXAMPLE 5

Hazelnut Liqueur with Maltodextrin

Stabiliser MCC/CMC (7 g, Avicel plus CF 2410®, FMC BioPolymer) and 210 g of water were agitated until full hydration. Protein (sodium caseinate, 18 g) and 78 g of water were agitated separately until full hydration. Hazelnut paste (Barry Callebaut, Belgium) (115 g) and water of 50° C. (150 g) were slowly agitated till a smooth mixture was formed.

The stabiliser and protein solution were then blended with the hydrated hazelnut paste. Alcohol (98 g, 96%), sugar (200 g) and water were added, up to a total volume amount of 800 ml, were added to the resulting liquid. The blend was pasteurised by heating the total blend to 72° C. and then homogenised. The blend was then cooled to ambient temperature and a mixture of 80 g maltodextrin (Maldex 150, supplier Syral Belgium, DE value 13-17), brandy distillate (48 g, 62% alcohol) and water up to a volume of 200 ml was mixed using a low speed agitator and the total blend was filled in bottles.

EXAMPLE 6

Pistachio Liqueur

Stabiliser MCC/CMC (10 g, Avicel CL 611®, FMC BioPolymer) and 210 g of water were agitated until full hydration. Protein (sodium caseinate, 18 g) and 78 g of water were agitated separately until full hydration. Pistachio paste (Pistazienmark, Gebr. Janke GmbH, Germany) (50 g) and water of 50° C. (100 g) were slowly agitated till a smooth mixture was formed.

The stabiliser and protein solution were then blended with the hydrated pistachio paste. To the resulting liquid alcohol (128 g, 96%), sugar (200 g) and water up to total volume amount of 1000 ml were added. The blend was pasteurised by heating the total blend to 72° C. and then homogenised. The blend was then cooled to ambient temperature and filled in bottles.

EXAMPLE 7

Chocolate Liqueur with Maltodextrin

Stabiliser MCC/CMC (6 g, Avicel RC 591, FMC BioPolymer) and 210 g of water were agitated until full hydration. Protein (sodium caseinate, 18 g) and 78 g of water were agitated separately until full hydration. Chocolate C811 (Barry Callebaut, Belgium) (65 g) and water of 65° C. (150 g) were slowly agitated till all chocolate was melted and a smooth mixture was formed.

The stabiliser and protein solution were then blended with the hydrated chocolate. To the resulting liquid alcohol (128 g, 96%), sugar (200 g) and water up to total volume amount of 850 ml were added. The blend was pasteurised by heating the total blend to 72° C. and then homogenised. The blend was then cooled to ambient temperature and a mixture of 80 g Maldex 150 and water up to a volume of 150 ml, was mixed using a low speed agitator and the total blend was filled in bottles.

EXAMPLE 8

Walnut Liqueur and Maltodextrin

Stabiliser MCC/CMC (6 g, Avicel RC 591, FMC BioPolymer) and 210 g of water were agitated until full hydration. Protein (sodium caseinate, 6 g) and 78 g of water were agitated separately until full hydration. Walnut paste (Walnussmark, Gebr. Janke GmbH, Germany) (60 g) and water of 50° C. (100 g) were slowly agitated till a smooth mixture was formed.

The stabiliser and protein solution were then blended with the hydrated walnut paste. To the resulting liquid alcohol (128 g, 96%), sugar (200 g) and water up to total volume amount of 750 ml were added. The blend was pasteurised by heating the total blend to 72° C. and then homogenised. The blend was then cooled to ambient temperature and a mixture of 90 g of Maltdex 150 and water up to a volume of 250 ml, was mixed using a low speed agitator and the total blend was filled in bottles.

EXAMPLE 9

Almond/Hazelnut/Pistachio Liqueur with Rum and Flavour

A blend was made using a low speed agitator to blend 300 g of bottled product of example 2, with 360 g of example 4 and 240 g of example 6. To this blend 40 g rum distillate (75%), 0.8 g vanilla flavour (Vanilla 300281, Symrise) and water up to the total volume of 1000 ml was added.

EXAMPLE 10

Almond Liqueur with Apricot Flavour

A blend was made using a low speed agitator to blend 950 g of bottled product of example 1 with 0.6 g Apricot flavour (Apricot 10024-36, Givaudan, Switzerland) dissolved in water up to a total volume of 1000 ml.

EXAMPLE 11

Chocolate Liqueur with Lower Amount of Stabiliser

Stabiliser MCC/CMC (4 g, Avicel RC 591, FMC BioPolymer) and 210 g of water were agitated until full hydration. Protein (sodium caseinate, 18 g) and 78 g of water were agitated separately until full hydration. Chocolate C811 (Barry Callebaut, Belgium) (65 g) and water of 65° C. (150 g) were slowly agitated till all chocolate was melted and a smooth mixture was formed. The stabiliser and protein solution were then blended with the melted chocolate. To the resulting liquid alcohol (128 g, 96%), sugar (200 g) and water up to total volume amount of 800 ml were added. The blend was pasteurised by heating the total blend to 72° C. and homogenised. The blend was then cooled to ambient temperature and a mixture of malto dextrin (Maldex 150, supplier Syral Belgium, DE value 13-17) (80 g) and water up to a volume of 200 ml was mixed with a low speed agitator and filled in bottles.

The product of this example shows a little less stability towards sedimentation of cocoa nut particles compared with example 7, but is still very acceptable.

EXAMPLE 12

Control Experiment (I) Without Stabiliser

Protein (sodium caseinate, 18 g) and 288 g of water were agitated until full hydration. Chocolate C811 (Barry Callebaut Belgium) (65 g) and water of 65° C. (150 g) were slowly agitated till all chocolate was melted and a smooth mixture was formed. The stabiliser and protein solution were then blended with the melted chocolate. To the resulting liquid alcohol (128 g, 96%), sugar (200 g) and water up to total volume amount of 800 ml were added. The blend was pasteurised by heating the total blend to 72° C. and homogenised. The blend was then cooled to ambient temperature and a mixture of maltodextrin (Maldex 150, supplier Syral Belgium, DE value 13-17) (80 g) and water up to a volume of 200 ml was mixed with a low speed agitator and filled in bottles.

This example 12 shows no stability towards sedimentation of the dark coloured cocoa particles in the chocolate. These particles form a thick layer on the bottom of the bottles within a few days.

EXAMPLE 13

Control Experiment (II) Without Stabiliser

Protein (sodium caseinate, 18 g) and 288 g of water were agitated until full hydration. Almonds (50 g) and water (75 g) were milled with a stone mill till a particle size smaller than 120 μm. The stabiliser and protein solution were then blended with the milled almonds. To the resulting liquid alcohol (128 g, 96%), sugar (140 g) and water up to total volume amount of 800 ml was added. To the resulting liquid alcohol (128 g, 96%), sugar (200 g) and water up to total volume amount of 800 ml were added. The blend was pasteurised by heating the total blend to 72° C. and homogenised. The blend was then cooled to ambient temperature and a mixture of maltodextrin (Maldex 150, supplier Syral, Belgium, DE value 13-17) (80 g), almond flavour (1 g) and water up to a volume of 200 ml was mixed with a low speed agitator and filled in bottles. The overall visual appearance of example 13 is less attractive, less homogeneous and showing an irregular colour of the liqueur.

Furthermore, example 13 shows no stability towards sedimentation of the light brown coloured, denser almond particles in the liqueur. The lighter, less dense particles form a layer on top of the liqueur in the neck of the bottles.

The invention claimed is:

1. An alcoholic liquid beverage having a pH between 6.5 and 7.5 and comprising:
   (a) between 15 and 150 g/l of a particulate nut material selected from the group consisting of peanut, walnut, hazelnut, almond, cashew, pecan, pine nut, pistachio, Brazil nut, macadamia nut, coconut and cocoa, wherein the nut material has a particle size between 0.05 and 200 µm;
   (b) between 0.2 and 1.0 wt. % of a stabiliser system consisting of microcrystalline cellulose and an anionic polysaccharide;
   (c) between 8 and 24 g/l of protein;
   (d) between 10 and 90 g/l of fat; and
   (e) between 75 and 250 g/l of alcohol
   wherein no fat layer is formed on top of the beverage after one year at storage.

2. The alcoholic beverage according to claim 1, wherein the nut material has a bimodal particle size, one volume fraction having a particle size between 0.05 and 0.75 µm, and one volume fraction having a particle size between 20 and 200 µm.

3. The alcoholic beverage according to claim 1, comprising between 25 and 125 g/l of the particulate nut material.

4. The alcoholic beverage according to claim 1, wherein the stabiliser system comprises 5-30 wt. %, on the basis of the stabiliser weight, of the anionic polysaccharide.

5. The alcoholic beverage according to claim 1, having a protein content between 3 and 60 g/l.

6. The alcoholic beverage according to claim 1, having a digestible carbohydrate content between 10 and 300 g/l.

7. The alcoholic beverage according to claim 1, wherein the nut material is selected from the group consisting of hazelnut, almond, and pistachio.

8. The alcoholic beverage according to claim 1, having an alcohol content between 110 and 170 g/l.

9. A process for producing an alcoholic nut liquid beverage according to claim 1, comprising:
   (a) dispersing the stabiliser system into an aqueous beverage base to form a dispersion;
   (b) mixing into the dispersion, in any order:
      (i) the particulate nut material; and
      (ii) the alcohol.

10. The process according to claim 9, wherein the nut material comprises (a) between 7.5 and 75 wt. % finely divided nut material, (b) 0-60 wt. % of added carbohydrates and (c) 20-80 wt. % of water and/or alcohol.

11. The alcoholic beverage according to claim 8, having an alcohol content between 125 and 150 g/l.

12. The alcoholic beverage according to claim 4, wherein the anionic polysaccharide comprises carboxymethyl cellulose.

13. The alcoholic beverage according to claim 1, further comprising a carbohydrate thickener consisting of cellulose, resistant starch, hemicellulose, β-glucans, inulin, maltodextrin, and plant or bacterial gums.

14. The alcoholic beverage according to claim 1, further comprising non-digestible carbohydrates.

* * * * *